US012608648B1

(12) United States Patent
Venkataraman et al.

(10) Patent No.: US 12,608,648 B1
(45) Date of Patent: Apr. 21, 2026

(54) SYSTEMS AND METHODS FOR USING SYNTHETIC DATA TO ENSURE TRAINING DATA IS PROPERLY REPRESENTATIVE

(71) Applicant: Wells Fargo Bank, N.A., San Francisco, CA (US)

(72) Inventors: Vinothkumar Venkataraman, Bangalore (IN); Yang Angelina Yang, Mountain View, CA (US); Ashutosh Verma, Bangalore (IN); Naveen Gururaja Yeri, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 924 days.

(21) Appl. No.: 17/816,127

(22) Filed: Jul. 29, 2022

(51) Int. Cl.
| | |
|---|---|
| *G06N 3/08* | (2023.01) |
| *G06F 18/213* | (2023.01) |
| *G06F 18/22* | (2023.01) |
| *G06N 20/00* | (2019.01) |

(52) U.S. Cl.
CPC ........... *G06N 20/00* (2019.01); *G06F 18/213* (2023.01); *G06F 18/22* (2023.01); *G06N 3/08* (2013.01)

(58) Field of Classification Search
CPC .......... G06N 20/00; G06N 3/08; G06F 18/22; G06F 18/213
See application file for complete search history.

(56) References Cited

U.S. PATENT DOCUMENTS

| | | |
|---|---|---|
| 10,825,182 B1 | 11/2020 | Le Moigne-Stewart et al. |
| 11,138,731 B2 | 10/2021 | Katzmann et al. |
| 2020/0320347 A1* | 10/2020 | Nikolenko ............. G06N 3/045 |
| 2020/0364551 A1* | 11/2020 | Dwivedi ................ G06N 3/045 |
| 2021/0025758 A1 | 1/2021 | Katz |
| 2021/0405544 A1 | 12/2021 | Werkman et al. |
| 2022/0027339 A1* | 1/2022 | Haim ................... G06F 16/2282 |
| 2023/0024796 A1* | 1/2023 | Hazard .................... G06N 5/04 |
| 2023/0334290 A1* | 10/2023 | Rama ..................... G06N 3/092 |
| 2024/0310500 A1* | 9/2024 | Demirel .............. G06N 3/0475 |

* cited by examiner

*Primary Examiner* — Beau D Spratt
(74) *Attorney, Agent, or Firm* — K&L Gates LLP

(57) ABSTRACT

Systems, apparatuses, methods, and computer program products are disclosed for generating representative training data. An example method includes comparing, by data analysis circuitry, a labeled dataset to a target dataset. The example method also includes generating, by training data circuitry, a training dataset based on the comparison, wherein the training dataset comprises at least a portion of the labeled dataset supplemented by a synthetic dataset. The example method also includes training, by modeling circuitry, a model using the training dataset.

20 Claims, 5 Drawing Sheets

302

Obtain a labeled dataset

304

Obtain a target dataset

306

Compare the labeled dataset to the target dataset

308

Generate, based on the comparison, a training dataset comprising at least a portion of the labeled dataset supplemented by a synthetic dataset

310

Train a model using the training dataset

402

Determine a similarity score between data points of the
labeled dataset and a data point of the target dataset

404

Similarity score of data
point satisfies threshold?

No

Yes

406

Populate the training dataset with the data point of the
labeled dataset

408

Remove the data point from the target dataset

SYSTEMS AND METHODS FOR USING SYNTHETIC DATA TO ENSURE TRAINING DATA IS PROPERLY REPRESENTATIVE

BACKGROUND

Organizations have a need to validate how their models operate to identify and mitigate model risk. Often, the data used to train a model is not fully representative of the population being modeled.

BRIEF SUMMARY

Predictive modeling is a commonly used statistical technique to predict future events or behavior. Predictive modeling may involve analyzing historical and current data and generating and deploying a model trained on that data to help predict future events, outcomes, and/or the like. Model validation is a process of confirming that a trained model actually achieves its intended purpose. In this regard, model validation may involve confirmation that the model performs adequately under the conditions of its intended use. In many cases, models may exhibit poor performance (e.g., output inaccurate predictions) due to insufficient training data. For example, the data used to train a model may not be fully representative of the population that is intended to be modeled. The training data may be insufficient for various reasons. In this regard, certain data that is needed to train a model may not be directly accessible. For instance, the data may be sensitive data pertaining to individuals who do not desire their data be shared or used for various purposes. Such data may be regulated through laws restricting access and/or use of the data. Additionally, in some cases, specific conditions of data needed for training the model may not be obtainable by way of authentic data (e.g., real data generated by real-world events) due to those specific conditions having not yet occurred.

To overcome these issues, example embodiments herein leverage synthetic data to supplement authentic data in a way that ensures that training data is properly representative of the relevant categories of interest to be modeled. Unlike authentic data, synthetic data is not obtained by direct measurement. In other words, synthetic data is artificially manufactured rather than generated by real-world events. Synthetic data may be generated algorithmically and may help reduce constraints that may typically limit the use of sensitive or regulated data. Synthetic data can also be used to tailor data to certain conditions that cannot be obtained from authentic data.

Systems, apparatuses, methods, and computer program products are disclosed herein for generating representative training data. In some embodiments, a system may identify an initial labeled, authentic dataset for training of a model. The system may then compare the labeled dataset to a target dataset that is known to be representative of a target population. Where there is not a sufficient similarity, the system may utilize both the initial labeled dataset and the target dataset to create a partially synthetic dataset that is appropriately representative of the target dataset. In this regard, a synthetic dataset may be generated to supplement the shortcomings of the labeled authentic dataset. The partially synthetic dataset may then be used for training of the model.

In one example embodiment, a method is provided for generating representative training data. The method includes comparing, by data analysis circuitry, a labeled dataset to a target dataset. The method also includes generating, by training data circuitry, a training dataset based on the comparison, wherein the training dataset comprises at least a portion of the labeled dataset supplemented by a synthetic dataset. The method also includes training, by modeling circuitry, a model using the training dataset.

In another example embodiment, an apparatus is provided for generating representative training data. The apparatus includes data analysis circuitry configured to compare a labeled dataset to a target dataset. The apparatus also includes training data circuitry configured to generate a training dataset based on the comparison, wherein the training dataset comprises at least a portion of the labeled dataset supplemented by a synthetic dataset. The apparatus also includes modeling circuitry configured to train a model using the training dataset.

In another example embodiment, a computer program product is provided for generating representative training data. The computer program product includes at least one non-transitory computer-readable storage medium storing software instructions that, when executed, cause an apparatus to compare a labeled dataset to a target dataset. The software instructions, when executed, also cause the apparatus to generate a training dataset based on the comparison, wherein the training dataset comprises at least a portion of the labeled dataset supplemented by a synthetic dataset. The software instructions, when executed, also cause the apparatus to train a model using the training dataset.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
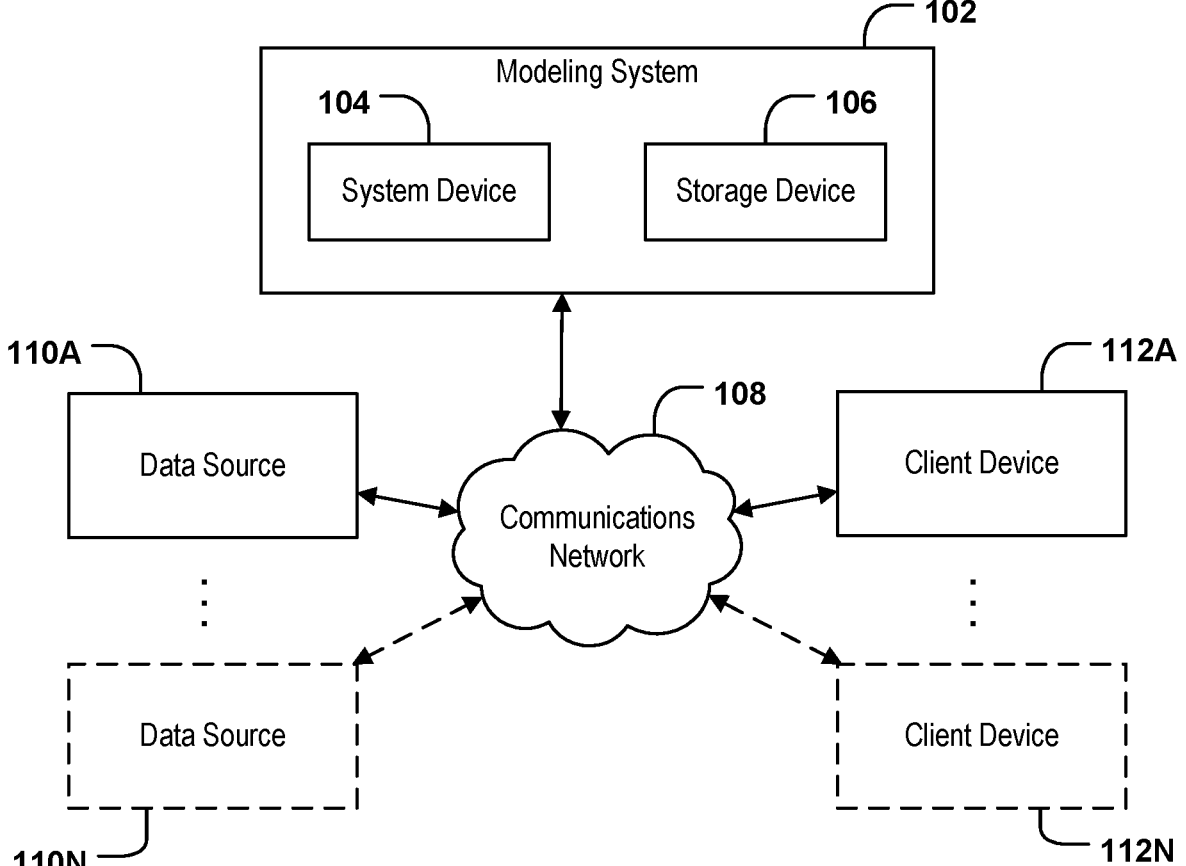
FIG. 1 illustrates a system in which some example embodiments may be used for generating representative training data.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, methods, apparatuses, systems, and computer program products are described herein that provide for generating representative training data for training a model. Traditionally, models may exhibit poor performance as a result of insufficient training data. In this regard, training data used to train a model may not be adequately representative of a target population about which the model is intended to make predictions. For instance, a model designed to predict global economic patterns may exhibit poor performance if a training dataset used to train the model does not include data regarding China and/or other large countries. As another example, a model designed to predict a nationality of a person when analyzing speech audio may exhibit poor performance if a training dataset used to train the model does not include data from French speakers. As yet another example, a model implemented by a banking institution that is designed to evaluate an individual's credit worthiness may exhibit poor performance if a training dataset used to train the model does not include data points from individuals having similar demographic backgrounds as that particular individual. That is, the pool of data collected by the banking institution and used to train the model may be associated with a customer base having a significantly different demographic makeup from the particular individual. For instance, this situation may occur with virtual banking institutions which may serve customer bases that differ significantly from customer bases served by traditional, brick-and-mortar banking institutions. Additionally, while model validation processes may consider a volume of training data used, many model processes fail to consider the representativeness of the training data for a target population for which the model is intended to be used.

Embodiments herein leverage synthetic data to supplement authentic (e.g., real) data based on an analysis of an authentic labeled dataset containing a plurality of authentic data points, and a separate target dataset known to be representative of a target population about which the model is intended to make predictions. In various embodiments, the labeled dataset may be identified for training of a new model. The initial labeled dataset may then be compared to the target dataset. Where there is not sufficient similarity, the system of an example embodiment may utilize both the labeled dataset and the target dataset to create a partially synthetic training dataset that is appropriately representative of the target dataset. The partially synthetic dataset may thereafter be used for training of the model.

Generation of the training dataset may comprise evaluating the target dataset and the authentic labeled dataset in conjunction to produce a similarity score between one or more data points in the two datasets. For each evaluated data point correspondence having a similarity score that satisfies a predetermined threshold, the system may insert the labeled authentic data point into a new training dataset and remove the respective data point from the target dataset. Following this extraction process, a new synthetic data point is generated for each data point that remains in the target dataset (i.e., each data point for which there is not a match in the labeled data set). The synthetic dataset comprising the newly generated synthetic data points is then inserted into the training dataset, thus establishing a partially synthetic training dataset that is fully representative of the target population, and that may be used for training a model.

Accordingly, the present disclosure sets forth systems, methods, and apparatuses that generate representative training data. There are many advantages of these and other embodiments described herein. For instance, by generating wholly representative training data, example embodiments improve existing model validation processes, which tend to focus on volume of training data rather than representativeness of training data. Beyond compliance with internal, external, regulatory, or legal model validation requirements, the generation of representative training data, in accordance with example embodiments, provides direct practically applicable benefits for the subsequent utilization of models, insofar as models trained with representative training data have a greater likelihood of exhibiting accurate and robust performance immediately, thereby increasing the efficiency of model deployment by avoiding or mitigating the need for more extensive training operations that can delay deployment of the model (e.g., into a production environment) and by avoiding the need for subsequent periods of model retraining.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which various embodiments may operate. As illustrated, a modeling system 102 may include a system device 104 in communication with a storage device 106. Although system device 104 and storage device 106 are described in singular form, some embodiments may utilize more than one system device 104 and/or more than one storage device 106. Additionally, some embodiments of the modeling system 102 may not require a storage device 106 at all. Whatever the implementation, the modeling system 102, and its constituent system device(s) 104 and/or storage device (s) 106 may receive and/or transmit information via communications network 108 (e.g., the Internet) with any number of other devices, such as one or more of data source 110A through data source 110N, and/or client device 112A through client device 112N.

System device 104 may be implemented as one or more servers, which may or may not be physically proximate to other components of modeling system 102. Furthermore, some components of system device 104 may be physically proximate to the other components of modeling system 102 while other components are not. System device 104 may receive, process, generate, and transmit data, signals, and electronic information to facilitate the operations of the modeling system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the modeling system 102. Storage device 106 may store information relied upon during operation of the modeling system 102, such as various geospatial data that may be used by the modeling system 102 and/or the like. In addition, storage device 106 may store control signals, device characteristics, and access credentials enabling interaction between the modeling system 102 and one or more of the data sources 110A-110N or client devices 112A-112N.

The one or more data sources 110A-110N may be embodied by servers or any computing devices known in the art, such as desktop or laptop computers, tablet devices, smartphones, or the like or may be embodied by any storage devices known in the art. Similarly, the one or more client devices 112A-112N may be embodied by any computing devices known in the art, such as desktop or laptop computers, tablet devices, smartphones, or the like. The one or more data sources 110A-110N and the one or more client devices 112A-112N need not themselves be independent devices, but may be peripheral devices communicatively coupled to other computing devices.

Although FIG. 1 illustrates an environment and implementation in which the modeling system 102 interacts with one or more of data sources 110A-110N and/or client devices 112A-112N, in some embodiments users may directly interact with the modeling system 102 (e.g., via input/output circuitry of system device 104). Whether by way of direct interaction or via a separate client device 112A-112N, a user may communicate with, operate, control, modify, or otherwise interact with the modeling system 102 to perform the various functions and achieve the various benefits described herein.

Example Implementing Apparatuses

Figure 2:
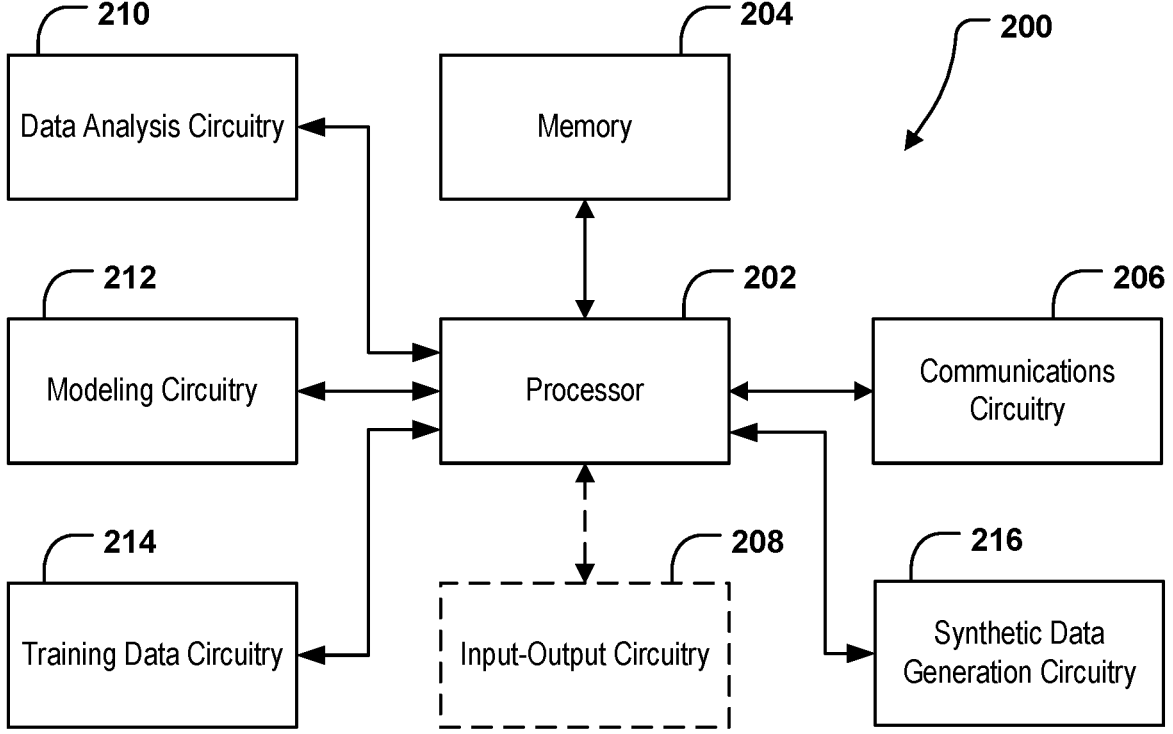
FIG. 2 illustrates a schematic block diagram of example circuitry embodying a device that may perform various operations in accordance with some example embodiments described herein.

System device 104 of the modeling system 102 (described previously with reference to FIG. 1) may be embodied by one or more computing devices or servers, shown as apparatus 200 in FIG. 2. As illustrated in FIG. 2, the apparatus 200 may include processor 202, memory 204, communications circuitry 206, input-output circuitry 208, data analysis circuitry 210, modeling circuitry 212, training data circuitry 214, and synthetic data generation circuitry 216, each of which will be described in greater detail below. While the various components are only illustrated in FIG. 2 as being connected with processor 202, it will be understood that the apparatus 200 may further comprise a bus (not expressly shown in FIG. 2) for passing information amongst any combination of the various components of the apparatus 200. The apparatus 200 may be configured to execute various operations described above in connection with FIG. 1 and below in connection with FIGS. 3-5.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input may be received via a separate device such as one of client devices 112A-112N (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises data analysis circuitry 210 that compares a labeled dataset to a target dataset and determines a similarity score between subsets of data points of the labeled dataset and target dataset. The data analysis circuitry 210 may also identify data points remaining in a target dataset after a data point extraction process is performed on the target dataset. The data analysis circuitry 210 may utilize processor 202, memory 204, or any other hardware component included in the apparatus 200 to perform these operations, for example, as described in connection with FIGS. 3-5 below. The data analysis circuitry 210 may further utilize communications circuitry 206 to gather data from a variety of sources (e.g., data sources 110A-110N, client devices 112A-112N and/or storage device 106, as shown in FIG. 1), may utilize input-output circuitry 208 to receive data from a user, and in some embodiments may utilize processor 202 and/or memory 204 to compare a labeled dataset to a target dataset, determine a similarity score between subsets of data points of the labeled dataset and target dataset, and identify data points remaining in a target dataset after a data point extraction process is performed.

In addition, the apparatus 200 further comprises modeling circuitry 212 that trains a model. In some embodiments, the modeling circuitry 212 may train a model using a partially synthetic training dataset. In some embodiments, the modeling circuitry 212 may also generate output data of a model having been trained using a partially synthetic dataset. For example, output data may comprise one or more predicted outputs based on corresponding inputs to a model. The modeling circuitry 212 may utilize processor 202, memory 204, or any other hardware component included in the apparatus 200 to perform these operations, as described in connection with at least FIG. 3 below. The modeling circuitry 212 may further utilize communications circuitry 206 to gather data from a variety of sources (e.g., data sources 110A-110N, client devices 112A-112N and/or storage device 106, as shown in FIG. 1), may utilize input-output circuitry 208 to receive data from a user, and in some embodiments may utilize processor 202 and/or memory 204 to train a model. In some embodiments, the modeling circuitry 212 may comprise a model (or multiple models), such as a machine learning (ML) model, artificial intelligence (AI) reasoning model, and/or the like which is utilized to generate output data (e.g., predicted outputs) based on corresponding input data provided to the model. In some embodiments, an example model of the modeling circuitry 212 may be trained using a training dataset that is partially synthetic (e.g., training data having both authentic data points and synthetic data points).

In addition, the apparatus 200 further comprises training data circuitry 214 that generates a training dataset that comprises at least a portion of a labeled (authentic) dataset supplemented by a synthetic dataset (which may be generated by synthetic data generation circuitry 216 further described below). To do so, the training data circuitry 214 may perform a data point extraction process further described below in connection with at least FIG. 4. The training data circuitry 214 may utilize processor 202, memory 204, or any other hardware component included in the apparatus 200 to perform these operations, as described in connection with FIGS. 3-5 below. The training data circuitry 214 may further utilize communications circuitry 206 to gather data from a variety of sources (e.g., data sources 110A-110N, client devices 112A-112N and/or storage device 106, as shown in FIG. 1), may utilize input-output circuitry 208 to receive data from a user, and in some embodiments may utilize processor 202 and/or memory 204 to generate a training dataset based on a comparison of a labeled dataset with a target dataset.

In addition, the apparatus 200 may optionally include synthetic data generation circuitry 216 that generates a synthetic dataset. The synthetic data generation circuitry 216 may utilize processor 202, memory 204, or any other hardware component included in the apparatus 200 to perform these operations, as described in connection with at least FIG. 5 below. The synthetic data generation circuitry 216 may further utilize communications circuitry 206 to gather data from a variety of sources (e.g., data sources 110A-110N, client devices 112A-112N and/or storage device 106, as shown in FIG. 1), may utilize input-output circuitry 208 to receive data from a user, and in some embodiments may utilize processor 202 and/or memory 204 to generate a synthetic dataset comprising synthetic data points representative of data points remaining in a target dataset after a data extraction process has been performed.

Although components 202-216 are described in part using functional language, it will be understood that the particular implementations necessarily include the use of particular hardware. It should also be understood that certain of these components 202-216 may include similar or common hardware. For example, the data analysis circuitry 210, modeling circuitry 212, training data circuitry 214, and synthetic data generation circuitry 216 may each at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the data analysis circuitry 210, modeling circuitry 212, training data circuitry 214, and synthetic data generation circuitry 216 may leverage processor 202, memory 204, communications circuitry 206, or input-output circuitry 208 as described above, it will be understood that any of these elements of apparatus 200 may include one or more dedicated processors, specially configured field programmable gate arrays (FPGA), neural engine(s), neural compute stick(s), tensor processing units (TPU), graphical processing unit (GPU), and/or application specific interface circuits (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the data analysis circuitry 210, modeling circuitry 212, training data circuitry 214, and synthetic data generation circuitry 216 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the apparatus 200. Thus, some or all of the functionality described herein may be provided by third party circuitry. For example, apparatus 200 may access one or more third party circuitries via any sort of networked connection that facilitates transmission of data and electronic information between the apparatus 200 and the third party circuitries. In turn, apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts.

Example Operations

Figure 3:
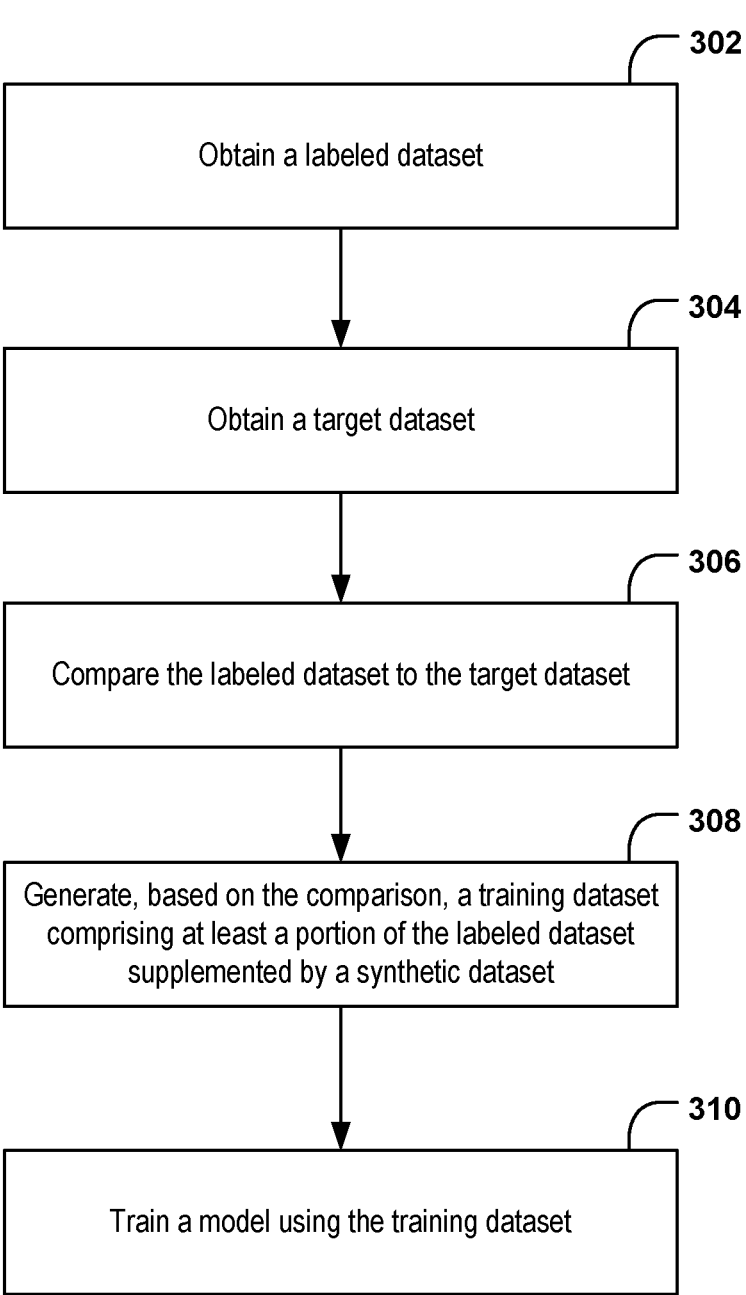
FIG. 3 illustrates an example flowchart for generating representative training data, in accordance with some example embodiments described herein.
Figure 4:
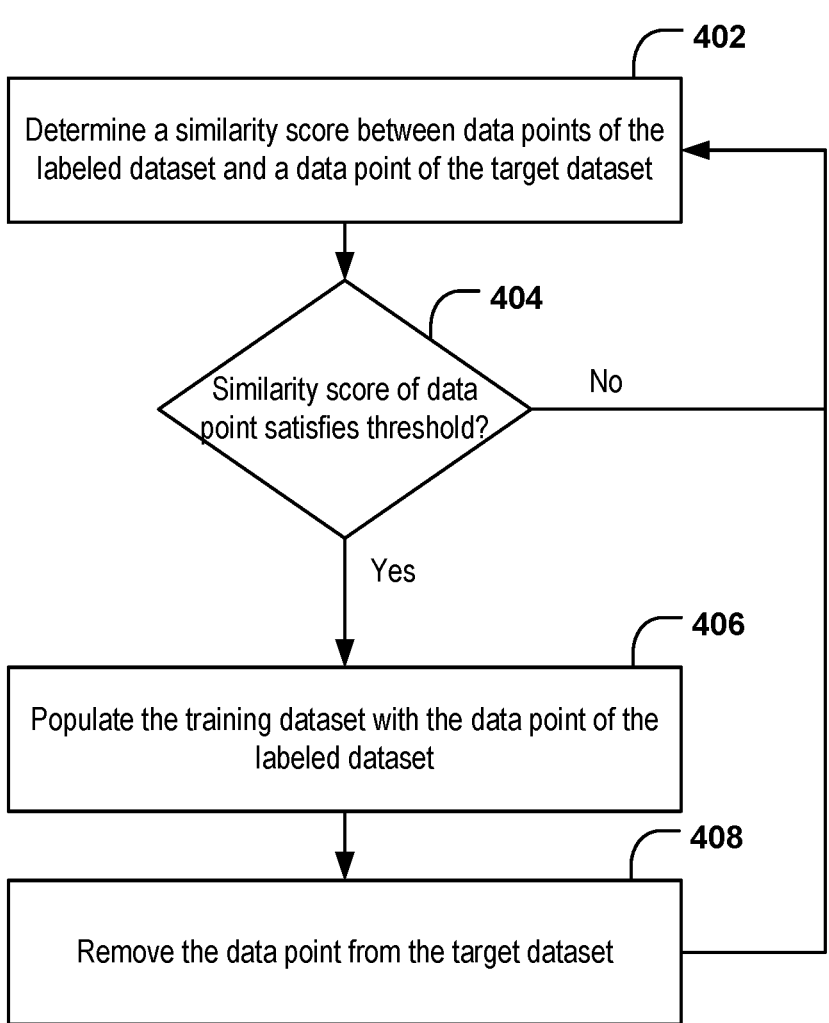
FIG. 4 illustrates an example flowchart for performing a data point extraction process for a target dataset, in accordance with some example embodiments described herein.
Figure 5:
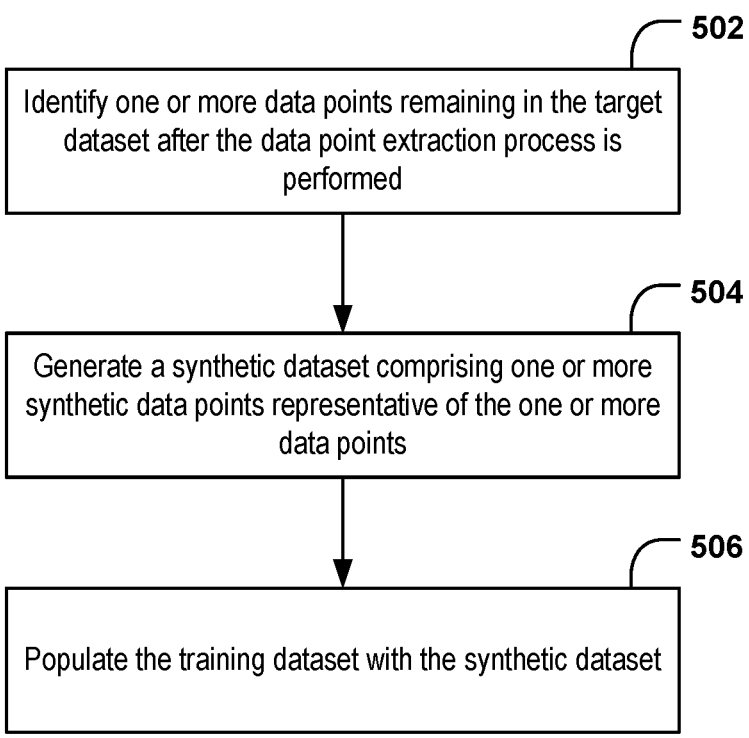
FIG. 5 illustrates an example flowchart for generating a synthetic dataset, in accordance with some example embodiments described herein.

Turning to FIGS. 3-5, example flowcharts are illustrated that contain example operations implemented by example embodiments described herein. The operations illustrated in FIGS. 3-5 may, for example, be performed by system device 104 of the modeling system 102 shown in FIG. 1, which may in turn be embodied by an apparatus 200, which is shown and described in connection with FIG. 2. To perform the operations described below, the apparatus 200 may utilize one or more of processor 202, memory 204, communications circuitry 206, input-output circuitry 208, data analysis circuitry 210, modeling circuitry 212, training data circuitry 214, synthetic data generation circuitry 216, and/or any combination thereof. It will be understood that user interaction with the modeling system 102 may occur directly via input-output circuitry 208, or may instead be facilitated by separate client device(s) 112A-112N, as shown in FIG. 1, and which may have similar or equivalent physical componentry facilitating such user interaction.

Turning first to FIG. 3, example operations are shown for generating representative training data. As shown by operation 302, the apparatus 200 may include means, such as processor 202, memory 204, communications circuitry 206, input-output circuitry 208, and/or the like, for obtaining a labeled dataset. In some embodiments, obtaining the labeled dataset may involve receiving the labeled dataset from another device. In some embodiments, obtaining the labeled dataset may involve a direct input of the labeled dataset (e.g., by a user utilizing input-output circuitry 208) to the modeling system 102. In some embodiments, obtaining the labeled dataset may involve accessing the labeled dataset from storage. For example, the labeled dataset may be accessed and retrieved from storage such as memory 204, storage device 106, and/or another storage medium (e.g., a cloud-based server or the like).

The labeled dataset may comprise authentic (e.g., real) data points that are labeled (e.g., data points that have been tagged with one or more labels identifying certain properties, characteristics, classifications, and/or contained objects). In some embodiments, the labeled dataset may be pre-processed (e.g., cleaned). The labeled dataset may be a portion of a larger dataset that includes a multitude of authentic data points collected over time. For example, the modeling system 102 and/or an entity (e.g., an organization or the like) managing the modeling system 102 may continuously collect authentic data points from a variety of sources, such as client devices (e.g., client devices 112A-112N) of customers, various computing devices associated with the entity, customers, and/or third party devices (e.g., data sources 110A-110N) and/or the like, which may in turn be stored (e.g., in storage device 106) as a labeled dataset with which the modeling system 102 may then utilize.

In some embodiments, authentic data points may be received from a plurality of data sources 110A-110N. Examples of these data sources 110A-110N may include third-party data service providers (e.g., companies that provide or sell user data), satellite data agencies (e.g., satellite imagery provided in real-time or in batches), vehicles (e.g., navigation systems and/or other devices onboard vehicles), smart devices (e.g., Internet-connected devices of any kind that may collect data, such as smart appliances, Internet-of-Things (IoT) devices or the like), and/or the like, retail and/or other businesses, cellular towers, Internet Service Providers (ISPs) providing aggregated population data, etc.

In some embodiments, authentic data points may be received from a plurality of client devices 112A-112N. Examples of these client devices 112A-112N may include devices such as mobile phones, laptops, tablets, smart watches, smart glasses, virtual reality (VR) headsets, Global Positioning System (GPS) devices such as navigation devices, and/or any other devices which may owned or carried by various users. In some embodiments, authentic data points may be received from client devices 112A-112N through a mobile application ("app") executing on the client devices. For example, the app may be associated with the modeling system. In some embodiments, as further described below, users may designate (e.g., via the mobile app) various permissions to collect open or anonymized data from various other apps on the device and/or as the user uses the particular device.

In some embodiments, the labeled dataset may be previously generated (e.g., manually generated) by selecting a plurality of authentic data points from authentic data points that have been collected and stored as described above. For instance, authentic data points may be selected based on a certain need to train a model for a specific purpose. For example, labeled authentic data points that are associated with U.S. citizens may be selected for inclusion in the labeled dataset for training a model that is intended to predict information related to U.S. citizens.

At operation 304, the apparatus 200 may include means, such as processor 202, memory 204, communications circuitry 206, input-output circuitry 208, and/or the like, for obtaining a target dataset. In some embodiments, the target dataset is known to be representative of a target population for a model, although in other embodiments the target dataset is believed to be representative of the target population even though its representative nature may not be verified. In this regard, the target dataset may include fields that reflect relevant categories of interest to be modeled. In some embodiments, a target dataset may be manually generated (e.g., by a team of data scientists or the like) and may contain data points corresponding to a known target population. In some embodiments, the target dataset may be automatically generated by the apparatus 200 (e.g., by the synthetic data generation circuitry 216) based on known statistical distributions in a target population and may contain data points (e.g., authentic and/or synthetic) related to such known statistical distributions. The target dataset may include data which is not necessarily labeled, but has characteristics of the target population for which a model is intended to be used.

In some embodiments, obtaining the target dataset may involve receiving the target dataset from another device. In some embodiments, obtaining the target dataset may involve a direct input of the target dataset (e.g., by a user utilizing input-output circuitry 208) to the modeling system 102. In some embodiments, obtaining the target dataset may involve accessing the target dataset from storage. For example, the target dataset may be accessed and retrieved from storage such as memory 204, storage device 106, and/or another storage medium (e.g., a cloud-based server or the like).

As shown by operation 306, the apparatus 200 includes means, such as processor 202, memory 204, data analysis circuitry 210, or the like, for comparing the labeled dataset to the target dataset. In this regard, once the labeled dataset and the target dataset are obtained by the modeling system 102, the two datasets may then be automatically compared to identify data points which are to be included in a training dataset designed for training a model. In some embodiments, comparing the labeled dataset to the target dataset comprises determining similarity scores between data points of the two datasets. In this regard, the apparatus 200 includes means, such as processor 202, memory 204, data analysis circuitry 210, or the like, for determining similarity scores between subsets of data points of the labeled dataset and the target dataset.

In some embodiments, a similarity score between a data point of the labeled dataset and a data point of the target dataset may represent a distance between the two data points (e.g., within a vector space). For instance, the data points may be transformed into vectors and thereafter compared. As one example, a statistical distance such as a Jaccard distance may be determined to gauge how similar the two data points are. Other statistical distances or similarity measures may be used in ultimately determining the similarity score, such as Euclidean distances, cosine similarity, and/or other statistical distances and/or similarity measures. In this regard, for each data point of the target dataset, an attempt to find a corresponding (e.g., similar) authentic data point of the labeled dataset may be performed that involves scoring the authentic data points in the labeled dataset in view of the data points of the target dataset. In some embodiments, a similarity score may comprise a value (e.g., a value between 0 and 1) that represents how similar the two data points are (with a value closer to 1 indicating a higher similarity).

In some embodiments, a training dataset may be generated based on the comparison of the labeled dataset and the target dataset. In this regard, as shown by operation 308, the apparatus 200 includes means, such as processor 202, memory 204, training data circuitry 214, or the like, for generating, based on the comparison, a training dataset. The training dataset may comprise at least a portion of the labeled dataset supplemented by a synthetic dataset.

To generate the training dataset, a data point extraction process may be performed, as outlined by operations shown in FIG. 4. In some embodiments, the data point extraction process may be performed for each data point of the target dataset.

As shown by operation 402 (and as described above) in FIG. 4, the apparatus includes means, such as processor 202, memory 204, data analysis circuitry 210, or the like, for determining a similarity score between data points of the labeled dataset and a data point of the target dataset. For instance, each data point in the labeled dataset may be compared to a first data point in the target dataset and assigned a respective similarity score.

As shown by decision point 404, if no data points of the labeled dataset are assigned a similarity score that satisfies a predefined threshold, the method may return to operation 402 wherein additional similarity scores may be determined for the data points of the labeled dataset and another data point of the target dataset. That is, this operation may be repeated for each data point in the target dataset (e.g., a second data point in the target dataset, a third data point in the target dataset, etc.), and respective similarity scores may be assigned accordingly.

If a similarity score of a data point (or multiple data points) in the labeled dataset satisfies a predefined threshold, the method may continue to operation 406, wherein the apparatus 200 includes means, such as such as processor 202, memory 204, training data circuitry 214, or the like, for populating the training dataset with the data point (i.e., the data point corresponding to the similarity score that satisfies the predefined threshold). In this regard, when there is sufficient similarity such that a data point in the labeled dataset is representative of a data point in the target dataset, the data point in the labeled dataset may be included in the training dataset for the model. In various examples, the predefined threshold may be predefined based on factors such as the availability, size, density, and quality of the labeled dataset and/or target dataset, the parameters of the modeling system, and the application of the model system, to name just a few of the many possible factors that may influence the threshold. For instance, a higher predefined threshold may be predefined for larger labeled datasets and larger target datasets, when compared to smaller labeled datasets and smaller target datasets. For instance, in some examples in which the similarity score is a value between zero (0) and one (1), the predefined threshold may be set at 0.9, such that any data points assigned a similarity score greater than or equal to 0.9 may be included in the training dataset.

As shown by operation 408, the apparatus 200 also includes means, such as processor 202, memory 204, training data circuitry 214, or the like, for removing the second data point from the target dataset. In this regard, if a similarity score between the data point of the target dataset and one or more data points of the labeled dataset satisfy the predefined threshold, the data point may be removed from the target dataset. By doing so, any data points left in the target dataset (i.e., after the data point extraction process has been performed for each data point in the target dataset) may represent data that is (i) needed for training the model and (ii) not found in the labeled dataset. Thus, the remaining data points in the target dataset may be identified as data for which synthetic data is to be generated in order to supplement the training dataset.

Turning to FIG. 5, as shown by operation 502, the apparatus 200 includes means, such as processor 202, memory 204, data analysis circuitry 210, or the like, for identifying one or more data points remaining in the target dataset (i.e., remaining data points) after the data point extraction process is performed. That is, apparatus 200 includes means for identifying one or more remaining data points within the target dataset that do not have a corresponding data point in the labeled dataset evidenced by a similarity score that meets or exceeds the predefined threshold. As shown by operation 504, the apparatus 200 includes means, such as processor 202, memory 204, synthetic data generation circuitry 216, or the like, for generating a synthetic dataset. The synthetic dataset may comprise one or more synthetic data points representative of the one or more remaining data points.

The synthetic dataset may be generated in a variety of ways. For example, the synthetic dataset may be generated using one or more algorithms that include decision trees, deep learning techniques, and/or iterative proportional fitting. In some embodiments, the synthetic dataset may be generated based, at least in part, on the labeled dataset. Using the labeled dataset, the synthetic dataset may be generated by determining best-fit statistical distributions for given data points in the labeled dataset. In some embodiments, a machine learning model may be used to fit the distributions. For example, machine learning models such as decision trees may model non-classical distributions which may be multi-modal, which may not contain common characteristics of known distributions. Using a machine learning fitted distribution, a synthetic dataset may be generated that is highly correlated with original, authentic data. That is, synthetic data points within the synthetic dataset may be generated to correspond to a data point of the remaining data points in the target data set such that a similarity score between at least one synthetic data point of the synthetic data set and one or more data points of the remaining data points satisfies the predefined threshold. Additionally, or alternatively, in some embodiments, deep generative models such as a Variational Autoencoder (VAE) and/or a Generative Adversarial Network (GAN) may be used to generate the synthetic dataset.

Regardless of how the synthetic dataset is generated, the synthetic dataset may be used to supplement the training dataset such that the training dataset is fully representative of the target dataset (i.e., the training dataset includes labeled data points (authentic or synthetic) that represent all data points of the target dataset and reflect relevant categories of interest to be modeled as defined by the target dataset). As shown by operation 506, the apparatus 200 includes means, such as processor 202, memory 204, training data circuitry 214, or the like, for populating the training dataset with the synthetic dataset. In this regard, a partially synthetic training dataset is automatically generated which incorporates both real data points and synthetic data points and ensures that training data is entirely representative of a target population outlined by the target dataset. Returning to FIG. 3, at operation 310, the apparatus 200 includes means, such as processor 202, memory 204, modeling circuitry 212, or the like, for training a model using the training dataset.

Once trained, the model may be tested (e.g., to verify accuracy of the model) and subsequently put into production to begin processing inputs to the model (e.g., authentic data points) to produce various output data in the form of predictions or the like. Advantageously, generating a partially synthetic training dataset as described herein generates a more robust trained model, and the model testing and validation processes may be greatly simplified, as the model is likely to exhibit sufficiently accurate performance based on having a training dataset that is fully representative of a target population for the model. Thus, embodiments herein enable a faster throughput time for model development and release.

As described above, example embodiments provide methods and apparatuses that generate representative training data and thereby enable a more robust and faster model validation process. By ensuring that a training dataset is fully representative of an intended target population a model is to make predictions for, example embodiments both (i) provide for a faster model validation process in that the model is more likely to be suitably accurate upon being trained and (ii) mitigate negative and otherwise complex issues that would arise from an inaccurate model in production. As these examples all illustrate, example embodiments contemplated herein provide technical solutions that solve real-world technical problems faced during traditional implementations of model validation.

FIGS. 3-5 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for training a model using representative training data, the method comprising:

comparing, by data analysis circuitry, each data point of a labeled dataset to each data point of a target dataset, wherein the labeled dataset comprises a plurality of authentic data points, and wherein the target dataset comprises a plurality of data points representing characteristics of a target population for which the model is to generate predictions;

determining, by the data analysis circuitry, a respective similarity score for each comparison, including a first similarity score for a first comparison of a first data point of the labeled dataset and a first data point of the target dataset;

generating, by training data circuitry, a training dataset that is fully representative of the target dataset and comprises at least a portion of the plurality of authentic data points of the labeled dataset supplemented by a synthetic dataset, wherein generating the training dataset comprises:

performing, by the training data circuitry, a data point extraction process for each comparison, including at least:

determining, by the training data circuitry, that the first similarity score satisfies a predefined threshold, and in response to determining that the first similarity score satisfies the predefined threshold:

populating, by the training data circuitry, the training dataset with the first data point of the labeled dataset, and removing, by the training data circuitry, the first data point of the target dataset from the target dataset;

identifying, by the data analysis circuitry, one or more data points remaining in the target dataset after the data point extraction process is performed;

generating, by synthetic data generation circuitry, the synthetic dataset, wherein the synthetic dataset comprises one or more synthetic data points representative of the one or more data points remaining in the target dataset; and populating, by the training data circuitry, the training dataset with the synthetic dataset; and training, by modeling circuitry, the model using the training dataset.

2. The method of claim 1, wherein the first similarity score represents a distance between the first data point of the labeled dataset and the first data point of the target dataset.

3. The method of claim 1, wherein the synthetic dataset is generated based at least in part on a statistical distribution of the labeled dataset.

4. The method of claim 1, wherein the predefined threshold is predefined based on a factor of at least one of the labeled dataset and the target dataset, wherein the factor comprises one of size, density, or quality.

5. The method of claim 1, wherein generating the synthetic dataset comprises generating a synthetic data point that corresponds to a remaining data point of the one or more data points remaining in the target dataset such that a similarity score between the synthetic data point and the remaining data point satisfies the predefined threshold.

6. The method of claim 1, further comprising:

prior to comparing each data point of the labeled dataset to each data point of the target dataset:

receiving, by communications circuitry, at least a portion of the plurality of authentic data points over time from a plurality of client devices of different device types, wherein the plurality of client devices are associated with individuals that are part of the target population for which the model is to generate the predictions.

7. The method of claim 1, wherein determining the respective similarity score for each comparison comprises determining a respective statistical distance for each comparison.

8. An apparatus for training a model using representative training data, the apparatus comprising:

data analysis circuitry configured to:

compare each data point of a labeled dataset to each data point of a target dataset, wherein the labeled dataset comprises a plurality of authentic data points, and wherein the target dataset comprises a plurality of data points representing characteristics of a target population for which the model is to generate predictions, and determine a respective similarity score for each comparison, including a first similarity score for a first comparison of a first data point of the labeled dataset and a first data point of the target dataset;

training data circuitry configured to:

generate a training dataset that is fully representative of the target dataset and comprises at least a portion of the plurality of authentic data points of the labeled dataset supplemented by a synthetic dataset by:

performing a data point extraction process for each comparison, including at least:

determining that the first similarity score satisfies a predefined threshold, and in response to determining that the first similarity score satisfies the predefined threshold:

populating the training dataset with the first data point of the labeled dataset, and removing the first data point of the target dataset from the target dataset;

wherein the data analysis circuitry is further configured to identify one or more data points remaining in the target dataset after the data point extraction process is performed, and wherein the apparatus further comprises synthetic data generation circuitry configured to generate the synthetic dataset, wherein the synthetic dataset comprises one or more synthetic data points representative of the one or more data points remaining in the target dataset;

wherein the training data circuitry is further configured to populate the training dataset with the synthetic dataset; and wherein the apparatus further comprises modeling circuitry configured to train the model using the training dataset.

9. The apparatus of claim 8, wherein the first similarity score represents a distance between the first data point of the labeled dataset and the first data point of the target dataset.

10. The apparatus of claim 8, wherein the synthetic data generation circuitry generates the synthetic dataset based at least in part on a statistical distribution of the labeled dataset.

11. The apparatus of claim 8, wherein the predefined threshold is predefined based on a factor of at least one of the labeled dataset and the target dataset, wherein the factor comprises one of size, density, or quality.

12. The apparatus of claim 8, wherein the synthetic data generation circuitry generates the synthetic dataset by generating a synthetic data point that corresponds to a remaining data point of the one or more data points remaining in the target dataset such that a similarity score between the synthetic data point and the remaining data point satisfies the predefined threshold.

13. The apparatus of claim 8, further comprising:

communications circuitry configured to:

receive, by communications circuitry and prior to comparing each data point of the labeled dataset to each data point of the target dataset, at least a portion of the plurality of authentic data points over time from a plurality of client devices of different device types, wherein the plurality of client devices are associated with individuals that are part of the target population for which the model is to generate the predictions.

14. The apparatus of claim 8, wherein the data analysis circuitry determines the respective similarity score for each comparison by determining a respective statistical distance for each comparison.

15. A computer program product for training a model using representative training data, the computer program product comprising at least one non-transitory computer-readable storage medium storing software instructions that, when executed, cause an apparatus to:

compare each data point of a labeled dataset to each data point of a target dataset, wherein the labeled dataset comprises a plurality of authentic data points, and wherein the target dataset comprises a plurality of data points representing characteristics of a target population for which the model is to generate predictions;

determine a respective similarity score for each comparison, including a first similarity score for a first comparison of a first data point of the labeled dataset and a first data point of the target dataset;

generate a training dataset that is fully representative of the target dataset and comprises at least a portion of the plurality of authentic data points of the labeled dataset supplemented by a synthetic dataset by:

performing a data point extraction process for each comparison, including at least:

determining that the first similarity score satisfies a predefined threshold, and in response to determining that the first similarity score satisfies the predefined threshold:

populating the training dataset with the first data point of the labeled dataset, and removing the first data point of the target dataset from the target dataset;

identifying one or more data points remaining in the target dataset after the data point extraction process is performed;

generating, by synthetic data generation circuitry, the synthetic dataset, wherein the synthetic dataset comprises one or more synthetic data points representative of the one or more data points remaining in the target dataset; and populating the training dataset with the synthetic dataset; and train the model using the training dataset.

16. The computer program product of claim 15, wherein the first similarity score represents a distance between the first data point of the labeled dataset and the first data point of the target dataset.

17. The computer program product of claim 15, wherein the predefined threshold is predefined based on a factor of at least one of the labeled dataset and the target dataset, wherein the factor comprises one of size, density, or quality.

18. The computer program product of claim 15, wherein generating the synthetic dataset comprises generating a synthetic data point that corresponds to a remaining data point of the one or more data points remaining in the target dataset such that a similarity score between the synthetic data point and the remaining data point satisfies the predefined threshold.

19. The computer program product of claim 15, further comprising:

prior to comparing each data point of the labeled dataset to each data point of the target dataset:

receiving, by communications circuitry, at least a portion of the plurality of authentic data points over time from a plurality of client devices of different device types, wherein the plurality of client devices are associated with individuals that are part of the target population for which the model is to generate the predictions.

20. The computer program product of claim 15, wherein determining the respective similarity score for each comparison comprises determining a respective statistical distance for each comparison.

* * * * *